United States Patent
Li et al.

(10) Patent No.: US 12,028,206 B2
(45) Date of Patent: Jul. 2, 2024

(54) MECHANISM FOR REDUCING LOGGING ENTRIES BASED ON CONTENT

(71) Applicant: Nokia Solutions and Networks Oy, Espoo (FI)

(72) Inventors: Ming Li, Beijing (CN); Caixia Chi, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 92 days.

(21) Appl. No.: 17/626,528

(22) PCT Filed: Jul. 19, 2019

(86) PCT No.: PCT/CN2019/096745
§ 371 (c)(1),
(2) Date: Jan. 12, 2022

(87) PCT Pub. No.: WO2021/012079
PCT Pub. Date: Jan. 28, 2021

(65) Prior Publication Data
US 2022/0294685 A1    Sep. 15, 2022

(51) Int. Cl.
| | |
|---|---|
| *H04L 41/069* | (2022.01) |
| *G06T 3/04* | (2024.01) |
| *G06T 3/4023* | (2024.01) |
| *G06T 11/00* | (2006.01) |
| *H04L 41/02* | (2022.01) |
| *H04L 41/0604* | (2022.01) |

(52) U.S. Cl.
CPC .......... *H04L 41/069* (2013.01); *G06T 3/04* (2024.01); *G06T 3/4023* (2013.01); *G06T 11/00* (2013.01); *H04L 41/02* (2013.01); *H04L 41/0604* (2013.01)

(58) Field of Classification Search
None
See application file for complete search history.

(56) References Cited

U.S. PATENT DOCUMENTS

| | | | |
|---|---|---|---|
| 9,619,478 B1 | 4/2017 | Singh et al. | |
| 11,068,373 B1 * | 7/2021 | Meurer | G06F 16/338 |

(Continued)

FOREIGN PATENT DOCUMENTS

| | | |
|---|---|---|
| CN | 103871088 A | 6/2014 |
| CN | 106776954 A | 5/2017 |

(Continued)

OTHER PUBLICATIONS

Extended European Search Report received for corresponding European Patent Application No. 19938915.6, dated Mar. 20, 2023, 6 pages.
Avidan et al., "Seam Carving for Content-Aware Image Resizing", ACM Transactions on Graphics, vol. 26, No. 3, Jul. 2007, pp. 10-11-10-9.
"Seam Carving", Wikipedia, Retrieved on Dec. 20, 2021, Webpage available at : https://en.wikipedia.org/wiki/Seam_carving.

(Continued)

*Primary Examiner* — Joni Hsu
(74) *Attorney, Agent, or Firm* — DITTHAVONG, STEINER & MLOTKOWSKI

(57) ABSTRACT

Embodiments relate to reducing logging entries based on contents are disclosed. According to the embodiments, the logging entries are converted into an image with pixels whose values are related with the log content and the image size is reduced by applying an image processing technology. The reduced image is converted back to the log entries. In this way, the number of logging entries is reduced without losing important information.

18 Claims, 10 Drawing Sheets

(56) References Cited

U.S. PATENT DOCUMENTS

| | | | |
|---|---|---|---|
| 2006/0161816 A1* | 7/2006 | Gula | H04L 63/1425 |
| | | | 714/39 |
| 2010/0225945 A1 | 9/2010 | Hatano | |
| 2013/0151787 A1 | 6/2013 | Riguer et al. | |
| 2014/0320883 A1 | 10/2014 | Ichida | |
| 2015/0036947 A1 | 2/2015 | Datar et al. | |
| 2017/0124761 A1 | 5/2017 | Michel et al. | |
| 2020/0073981 A1* | 3/2020 | Pilkington | G06F 16/2272 |
| 2020/0342252 A1* | 10/2020 | Givental | G08B 29/186 |
| 2021/0064500 A1* | 3/2021 | Przestrzelski | G06F 11/079 |

FOREIGN PATENT DOCUMENTS

| | | |
|---|---|---|
| DE | 10-2016223484 A1 | 5/2018 |
| EP | 2357730 A1 | 8/2011 |

OTHER PUBLICATIONS

Wu et al., "Semantic-preserving Word Clouds by Seam Carving", Eurographics / IEEE Symposium on Visualization (EuroVis 2011), vol. 30, No. 3, 2011, pp. 741-750.

"A Cloud-based Web Application for Transforming User-generated Content", Dissertation, Sep. 2009, 77 pages.

"Avoid Duplicate Entries in AWS Cloudtrail Logs", Cloud One Conformity, Retrieved on Dec. 20, 2021, Webpage available at : https://www.trendmicro.com/cloudoneconformity/knowledge-base/CloudTrail/cloudtrail-global-services-logging-duplicated.html.

Fan et al., "Intrusion Investigations with Data-Hiding for Computer Log-File Forensics", 5th International Conference on Future Information Technology, May 21-23, 2010, 6 pages.

International Search Report and Written Opinion received for corresponding Patent Cooperation Treaty Application No. PCT/CN2019/096745, dated Apr. 17, 2020, 10 pages.

\* cited by examiner

MECHANISM FOR REDUCING LOGGING ENTRIES BASED ON CONTENT

RELATED APPLICATION

This application claims priority to PCT Application No. PCT/CN2019/096745, filed on Jul. 19, 2019, each of which is incorporated herein by reference in its entirety.

FIELD

Embodiments of the present disclosure generally relate to the field of communications and in particular, to a method, device, apparatus and computer readable storage medium for reducing logging entries based on content.

BACKGROUND

In a cloud environment, there may be thousands of services deployed on one host and the logs/metrics/alarms output by these services become a standard way for users to observe these services. The logging service which stores logs in local files and allows user to observe them on its running host is not applicable in cloud environment, since the services may be dynamically scheduled to different host based on system resource usage and service deployment policy. Collecting all logs in a centralized space automatically becomes a common requirement for service providers. For example, in a framework of open network automation platform (ONAP), logs/metrics/alarms are all taken as events which are identified via event types and needs be sent to DCAE for centralized analysis.

SUMMARY

Generally, embodiments of the present disclosure relate to a method for reducing logging entries based on content and the corresponding communication devices.

In a first aspect, there is provided a device. The device comprises at least one processor; and at least one memory including computer program codes; the at least one memory and the computer program codes are configured to, with the at least one processor, cause the device to for each logging entry of a set of logging entries, determine a pixel value for the logging entry based on a content of the logging entry. The device is also caused to generate a first image for the set of logging entries based on the pixel values. The device is further caused to generate a second image by reducing a size of the first image using a predetermined algorithm.

In a second aspect, there is provided a method. The method comprises or each logging entry of a set of logging entries, determining a pixel value for the logging entry based on a content of the logging entry. The method also comprises generating a first image for the set of logging entries based on the pixel values The method further comprises generating a second image by reducing a size of the first image using a predetermined algorithm.

In a third aspect, there is provided an apparatus. The apparatus comprises means for determining a pixel value for the logging entry based on a content of the logging entry, for each logging entry of a set of logging entries. The apparatus also comprises means for generating a first image for the set of logging entries based on the pixel values. The apparatus further comprises means for generating a second image by reducing a size of the first image using a predetermined algorithm.

In a fourth aspect, there is provided a non-transitory computer readable medium comprising program instructions for causing an apparatus to perform at least the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
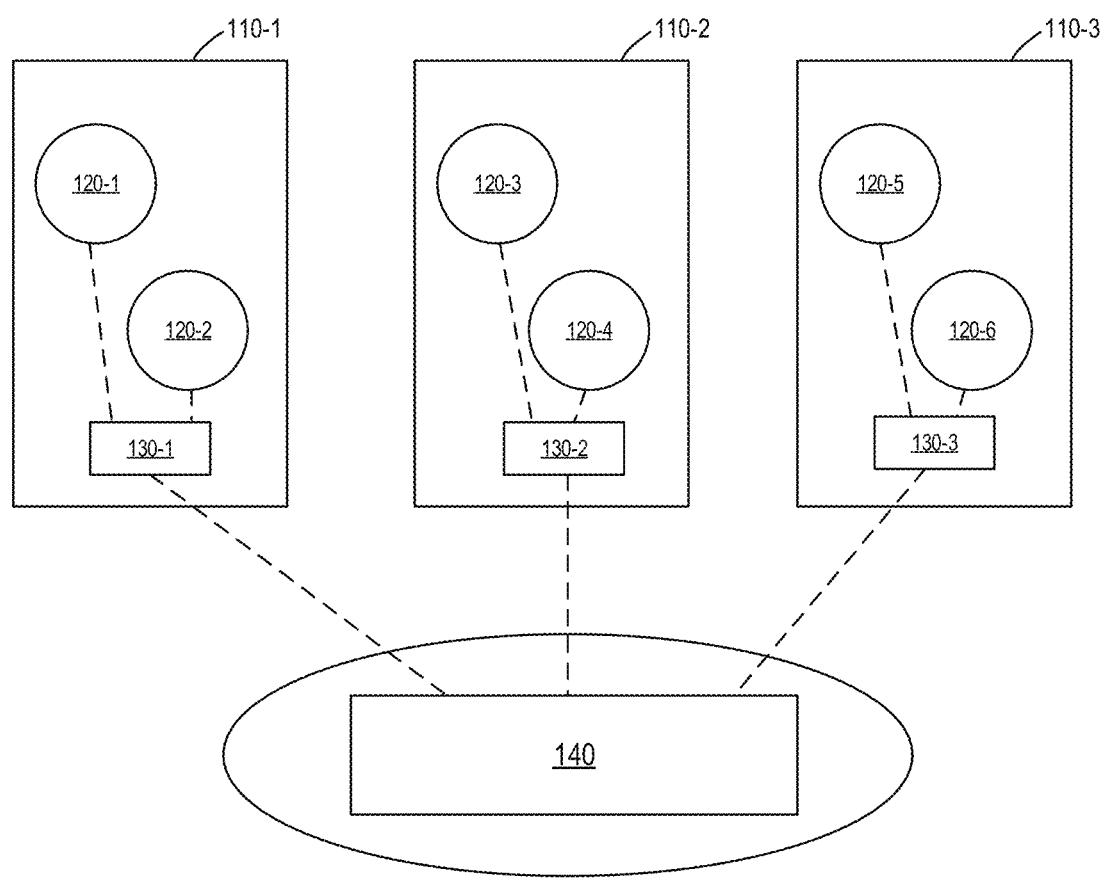
FIG. 1 illustrates a schematic diagram of a container environment according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Centralized logging requirements bring a challenge against the logging system on its processing through output and scalability. If it is not well designed, logs which could be in large volume by rainy day scenario may be transmitted on the network and across multiple routers/nodes, it can consume lots of resources. The technology of brevity control is a way to control abnormal large/duplicated log streams and it becomes more important and need to be re-considered in container deployment environment. When logs are stored or observed locally, brevity control only occurs once during log generation and process. But in container environment, a log may transverse services in multiple namespaces and each log will have its own control police. It is almost un-predictable what logs will be received in destination when brevity control has been invoked.

FIG. 1 illustrates a diagram where the widely used log solution is applicable in cloud environment: Each service pod (for example, the pods 120-1, 120-2, 120-3, 120-4, 120-5 and 120-6) can forward its log to the collecting log daemon, such as fluentd (for example, the fluentd 130-1, 130-2 and 130-3) or fluentbit. The log daemon may be responsible to send the logs to the Operation and Maintenance (OAM) services shown as block 140 in FIG. 1. The OAM services may comprise log analysis services, measurement process services or alarm services.

The brevity control can exist in the original log generating place, for example, between service pod and log collection daemon. The brevity control may also exist between log collection daemon and OAM service. Alternatively, the brevity control may exist between Operation, Administration & Maintenance (OA&M) and Data Collection and Analysis Engine (DCAE) of an operator. Generally, there may be no coordination in the brevity control policy between these nodes, so the logs reach DCAE may lose its original information.

As mentioned above, on one cluster, hundreds of service pods can run on its worker nodes. All the standard output (stdout) of each service pod may be forwarded to one logging daemon on their running node, so the total number of log entries forwarding to the logging daemon may be one bigger value. It may be near to several thousand entries each second. Among these logs, there may be many similar entries, and they may occur on the closest timestamp. Thus, it needs further research on whether some logs can be dropped to save resource usage and/or what entries can be removed without information lost.

Conventionally, when speed of logging generating exceeds the logging system throughput, simple brevity control processing may be based on predefined filter-rule on log content. Alternatively, the logs can be dropped in the fixed interval or on random basis.

However, both above approaches need predefined rules/policies and there is no way to coordinate the configurations of them on different hops in their transmission to destination, so no guarantee of the original logs patterns is maintained.

Further, in conventional technologies, the filter-rule for dropping logs shall be predefined and different logs require the different rule, which is not flexible. In some cases, useful log entries may be dropped and the duplicated log entries may be left, which caused information lost. The log traffic may significantly impact the final filtering effect. Moreover, when the number of rules increases, the entire log system performance may be dramatically degraded. Thus, new methods for reducing the logs are needed.

Generally, the ONAP has standardized logs/alarms/metrics events to include common headers to indicate sources of the events and defines different attributes for the events. Many logging systems also have standardized format. The common events format can facilitate solving the problem. For example, the same kind of logs from the different service pod is only different in the specified field. It is easier to parse the logging entries to identify same logs.

According to embodiments of the present disclosure, the logging entries are converted into an image with pixels whose values are related with the log content and the image size is reduced by applying an image processing technology. The reduced image is converted back to the log entries. In this way, the number of logging entries is reduced without losing important information.

Figure 2:
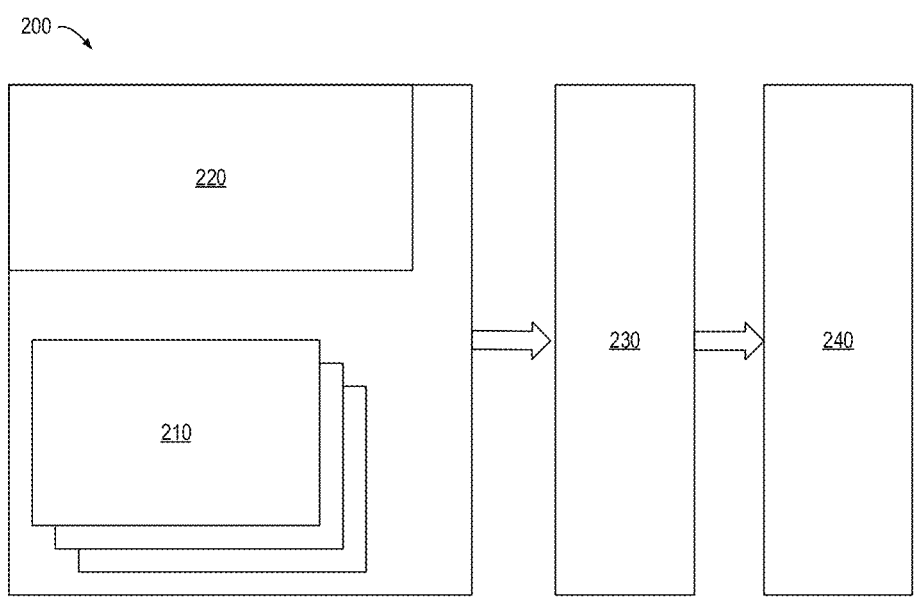
FIG. 2 illustrates a schematic diagram of a system where embodiments of the present disclosure can be implemented according to embodiments of the present disclosure.

FIG. 2 illustrates a schematic diagram of a system 200 in which embodiments of the present disclosure can be implemented. The system 200 may comprise a virtual machine 210, an application container 220, an OA&M entity 230 and a DCAE entity 240. It should be noted that system 200 can comprise any suitable devices/entities/modules. The entities/modules shown in FIG. 2 are only examples, not limitations. The system 200 may include any suitable number of devices/entities/modules adapted for implementing embodiments of the present disclosure. It is to be understood that the numbers of entities/modules shown in FIG. 2 are given for the purpose of illustration without suggesting any limitations. The entities/modules shown in FIG. 2 may refer to any devices and/or computing and storage resources which can implement embodiments of the present disclosure. For example, the virtual machine 210 may be implemented on a network device. Alternatively, the virtual machine 210 may be implemented on a terminal device. Embodiments of the present disclosure are not limited in this aspect. It should be noted that embodiments of the present disclosure can be implemented at any parts of the system 200 where the brevity control is applicable.

Figure 3:
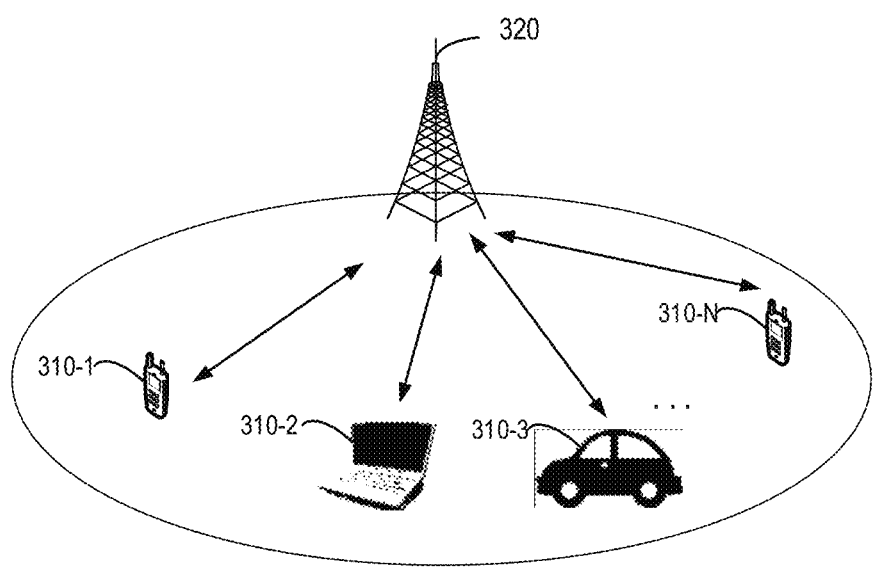
FIG. 3 illustrates a schematic diagram of an environment where embodiments of the present disclosure can be implemented according to embodiments of the present disclosure.

FIG. 3 illustrates a schematic diagram of a communication system 300 in which embodiments of the present disclosure can be implemented. As shown in FIG. 3, the communication system 300 may comprise a network device 320. The communication system 300 may a terminal device 310-1, a terminal device 310-2, a terminal device 310-3, . . . , a terminal device 310-N (where collectively refer to as "the terminal device 310"). The terminal device 310 may be a portable device. Alternatively or in addition, the terminal device 310 may be consumer device connected in Internet of Things.

Communications in the system 300 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 4:
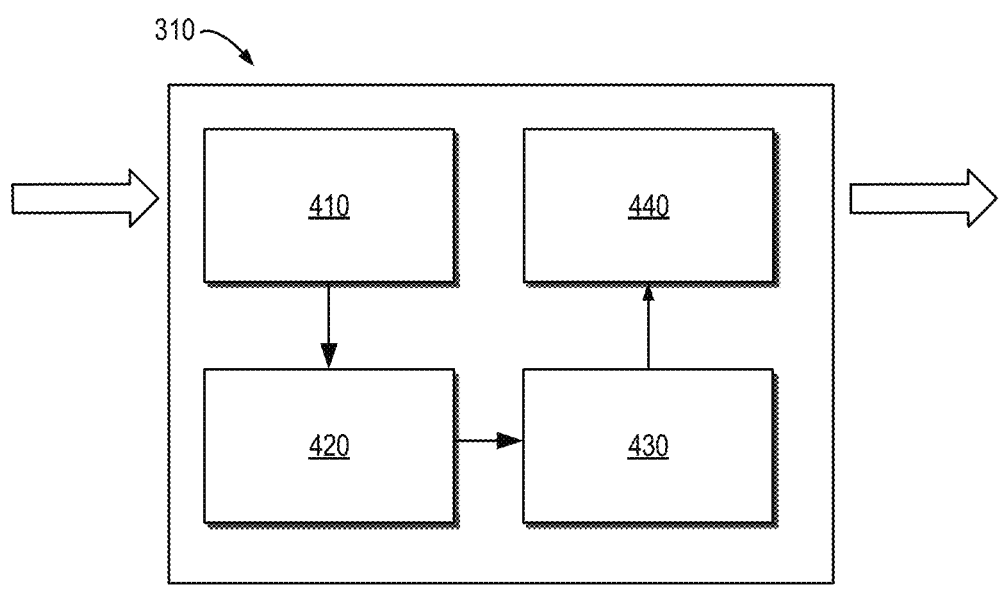
FIG. 4 illustrates a schematic diagram of a device where embodiments of the present disclosure can be implemented according to embodiments of the present disclosure.

FIG. 4 illustrates a schematic diagram of a device 400 where embodiments of the present disclosure can be implemented according to embodiments of the present disclosure. The modules shown in FIG. 4 may be any software modules and/or hardware which are able to implement embodiments of the present disclosure. The device 400 may be implemented as the terminal device 310. Alternatively, the device 400 may also be implemented as the network device 320.

In some embodiments, the terminal device 400 comprises a partition module 410 which partitions a plurality of logging entries based on their headers, a converting module 420 which converts the plurality of logging entries into image, a reducing module 430 which reduces the image size, and a restoring module 440 which restores the reduced image to the plurality of reduced logging entries. It should be noted that the modules shown in FIG. 4 are only examples; the device 400 may comprise any suitable modules. The device 400 may be implemented at the virtual machine 210. Alternatively, the device 400 may be implemented at the DCAE 240. It should be noted that the device 400 may be implemented at any places where the brevity control is needed. Embodiments of the present disclosure are not limited in this aspect.

Figure 5:
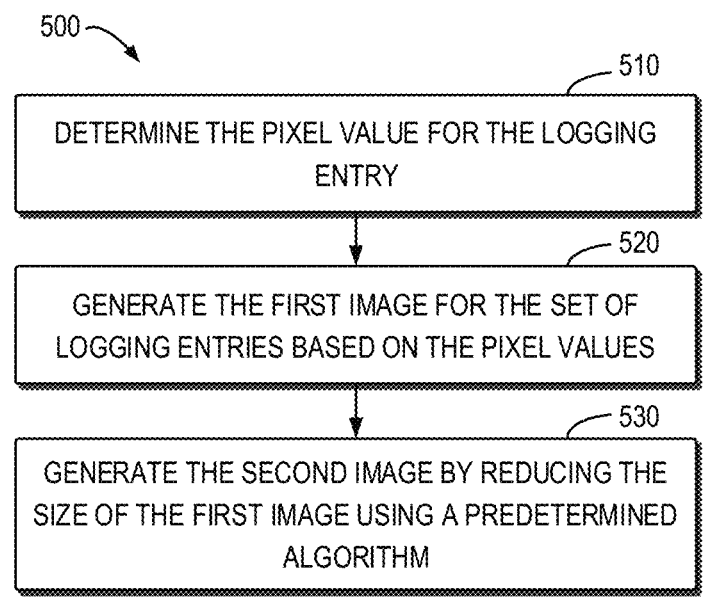
FIG. 5 illustrates a flow chart of a method implemented at a device according to embodiments of the present disclosure.

FIG. 5 illustrates a flow chart of a method 500 in accordance with embodiments of the present disclosure. The method 500 may be implemented at any suitable devices.

Only for the purpose of illustrations, the method 500 is described to be implemented at the device 400.

In some embodiments, the device 400 may receive a plurality of logging entries E(t) for a period of time t. The logging entries may be received from multiple services. In some embodiments, the partition module 310 may divide the plurality of logging entries into respective sets of logging entries based on their headers. The header of one logging entry may specify the source of the logging entry. In some embodiments, the plurality of logging entries E(t) may be partitioned into small sets l(k,t) via one hashing function based on the common header of each log entry. The parameter k is the index of the active service to be managed by this log engine. For example, total number of active services is N, k will be range from 0 to N−1. L(k,t) is the maximum number of logs allowed to be sent by the service k.

At block 510, the device 400 determines the pixel value for the logging entry based on the content of the logging entry, for each of the set of logging entries l(k,t). The pixel value may be determined using a predetermined function. The set of logging entries has the same header. The header specifies the source of the logging entries. In some embodiments, the converting module 420 may calculate the pixel value of each log entry via a normalization function in its incoming sequence. The content of the logging entry may comprise information regarding how one or more applications running on the device 400.

In some embodiments, the device 400 may generate a signature of the logging entry. The signature is specific to the content of the logging entry. The device 400 may perform normalization on the signature and generate the pixel value based on the normalized signature. For example, the normalized function may be defined as MD5 function of the given log string for simplicity.

In other embodiments, the device 400 may generate the pixel value for the logging entry based on the frequency of the occurrence of the logging entry in the set of logging entries, the higher frequency the smaller pixel values. For example, if the logging entry occurs less than a predetermined number of times, the pixel value may be determined as a first value. If the logging entry occurs more than the predetermined number of times, the pixel value is determined as a second value. The second value is smaller than the first value.

In some embodiments, the normalized function is given as 1/frequency. For example, when the logging entry occurs once in the set of logging entries, its pixel value is 1, the more frequent it occurs, the less value it may be.

At block 520, the device 400 generates the first image for the set of logging entries based on the pixel values. In some embodiments, the device 400 may sort the pixels based on their arrival time. For example, the device 400 may sort the pixel values in an order of arrival times of the respective logging entries in the set of logging entries. The device 400 may further combine the sorted pixel values to generate the first image.

The device 400 may also determine the sequence identity of the pixel value based on its arrival time. For example, the device 400 may put this pixel value in grids with x coordinate which is the sequence identity to generate the image.

At block 530, the device 400 generates the second image by reducing the size of the first image. For example, as mentioned above, the number of pixels in the original image may be number of entries in the set l(k,t) and the number of pixels in the reduced image may be less than L(k,t). In some embodiments, the device 400 may reduce the image size by seam carving algorithm. It should be noted that the size of the image may be reduced by any suitable ways. The device 400 may determine a subset of logging entries from the set of logging entries. The pixel values of the subset of logging entries may be below a threshold value. Seam caring of content-aware image resizing algorithm is explained as following: a vertex may represent a pixel, the edge is from pixel to 3 downward neighbors, and the weight of pixel is represented by energy function of 8 neighboring pixels. The "seam" may refer to the shortest path (sum of vertex weights) from top to bottom.

Figure 6A:
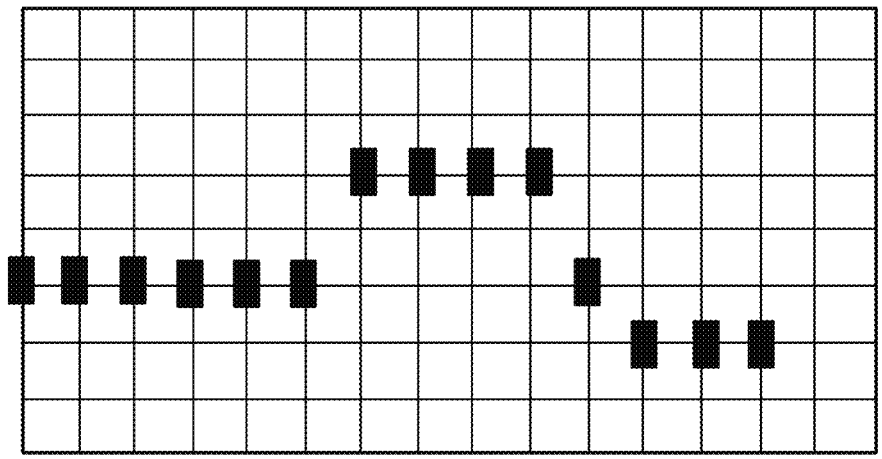
FIGS. 6A-6C illustrate schematic diagrams of a procedure of seam carving according to embodiments of the present disclosure.
Figure 6B:
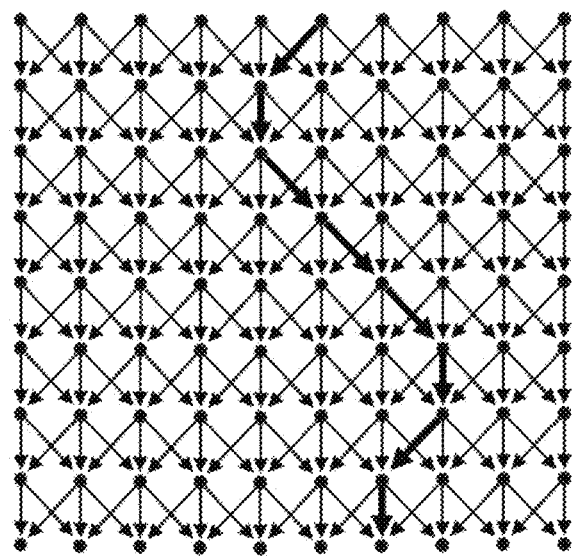
Figure 6C:
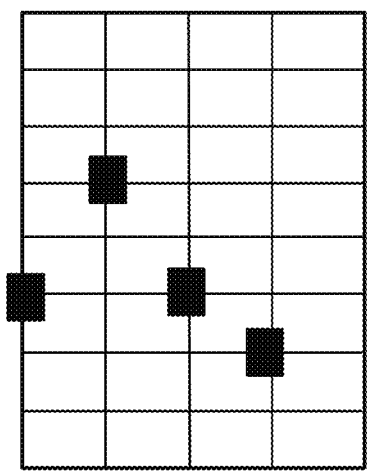

FIGS. 6A-6C illustrate the procedure of reducing the logging entries according to some embodiments of the present disclosure. FIG. 6A illustrates the first image of the set of logging entries with a plurality of pixels. As shown in FIG. 6B, there is a path which connects the subset of logging entries and one pixel will be removed from one column. The removed pixels can bring minimum impact on the image since the removed pixels have lower energy compared to the remained ones. As shown in FIG. 6C, the second image may be generated by removing the pixels from the first image. The second image may contain four pixels.

In this way, no user configuration is needed and all inputs come from running system and pre-defined capacity. Further, it avoids defining filter-rules which is bounded with the log content.

Table 1 shows pseudo codes for the seam carving algorithm. The seam-carving algorithm can change the size of an image by gracefully carving-out or inserting pixels in different parts of the image. The seam-carving algorithm uses an energy function defining the importance of pixels. A seam is a connected path of low energy pixels crossing the image from top to bottom, or from left to right. By successively removing or inserting seams, the size of the image in both directions can be reduced. For image reduction, seam selection ensures that while preserving the image structure, more of the low energy pixels and fewer of the high energy ones may be removed.

TABLE 1

```
public static void main(String[ ] args)
{
// all log entries are existed in E[ ]
// step 1: partition the logs, partition E[ ] into l[k][ ] (k : 0..N−1)
for (int i =0; i < E.length; i++) {
   // call normalizeFunc( ) agains each log entry common header
   int n_v = normalizedFunc(E[i])
   // according to n_v, put log entry E[i] into l[ ]
   l[n_v % N].put(E[i]);
}
for (int i =0; i < N; i++) {
   // step 2: convert log entry to the image
   convertl[i] into inputImg
   SeamCarver sc = new SeamCarver(inputImg);
```

TABLE 1-continued

```
    // step 3: compress image (originalCountOfPixel - removeColumns <= L(k,t))
    for (int i = 0; i < removeColumns; i++) {
      int[ ] verticalSeam = sc.findVerticalSeam( );
      sc.removeVerticalSeam(verticalSeam);
    }
    // step 4: restore image to log entries
    convert inputImsg to l'[i]
  }
  // step 5: merge l'[ ] toE'[ ]
  for (int i =0; i < N; i++) {
    append l'[i] into E'[ ] according to the timestamp
  }
}
public class SeamCarver {
  private Picture picture;
  private double[ ] energy;
  private double[ ] distTo;
  private int[ ] edgeTo;
  public SeamCarver(Picture picture) {
    this.picture = new Picture(picture);
  }
  public Picture picture( ) {
    return new Picture(this.picture);
  }
  public int width( ) {
    return picture.width( );
  }
  public int height( ) {
    return picture.height( );
  }
  private int position(int col, int row) {
    return width( ) * row + col;
  }
  private int positionColumn(int position) {
    return position % width( );
  }
  public double energy(int x, int y) {
    if (x < 0 || y < 0 || x >= width( ) || y >= height( )) {
      throw new java.lang.IndexOutOfBoundsException( );
    }
    if (x == 0 || x == width( ) - 1 || y == 0 || y == height( ) - 1) {
      return 255*2;
    }
    return squareGradient(Point(x-1, y), Point(x+1, y))
      + squareGradient(Point(x, y-1), Point(x, y+1));
  }
  private int squareGradient(Point one, Point two) {
    int diff = Math.abs(one.getGray( ) - two.getGary( ));
    return diff;
  }
  private void relax(int from, int to) {
    if (distTo[to] > distTo[from] + energy[to]) {
      distTo[to] = distTo[from] + energy[to];
      edgeTo[to] = from;
    }
  }
  // identify the column to remove
  public int[ ] findVerticalSeam( ) {
    int size = width( ) * height( );
    energy = new double[size];
    distTo = new double [size];
    edgeTo = new int[size];
    int p;
    for (int col = 0; col < width( ); col++) {
      for (int row = 0; row < height( ); row++) {
        p = position(col, row);
        if (row == 0) {
          distTo[p] = 0;
        } else {
          distTo[p] = Double.POSITIVE_INFINITY;
        }
        energy[p] = energy(col, row);
        edgeTo[p] = -1;
      }
    }
    for (int row = 0; row < height( ) - 1; row++) {
      for (int col = 0; col < width( ); col++) {
        p = position(col, row);
        if (col - 1 >= 0) {
          relax(p, position(col-1, row+1));
```

TABLE 1-continued

```
        }
        relax(p, position(col, row+1));
        if (col + 1 < width( )) {
            relax(p, position(col+1, row+1));
        }
      }
    }
    double min = Double.POSITIVE_INFINITY;
    int end = 0;
    for (int col = 0; col < width( ); col++) {
        if (distTo[position(col, height( )-1)] < min) {
            min = distTo[position(col, height( )-1)];
            end = position(col, height( ) - 1);
        }
    }
    return verticalSeam(end);
}
private int[ ] verticalSeam(int end) {
    int[ ] result = new int[height( )];
    int tmp = end;
    while (tmp >= 0) {
        result[positionRow(tmp)] = positionColumn(tmp);
        tmp = edgeTo[tmp];
    }
    return result;
}
public void removeHorizontalSeam(int[ ] a) {
    if (height( ) <= 1) {
        throw new java.lang.IllegalArgumentException( );
    }
    if (a.length != width( )) {
        throw new java.lang.IllegalArgumentException( );
    }
    Picture result = new Picture(width ( ), height( ) - 1);
    int prev = a[0];
    for (int col = 0; col < width( ); col++) {
        if (a[col] < 0 || a[col] >= height( )) {
            throw new java.lang.IndexOutOfBoundsException( );
        }
        if (a[col] < prev - 1 || a[col] > prev + 1) {
            throw new java.lang.IllegalArgumentException( );
        }
        prev = a [col];
        for (int row = 0; row < height( ) - 1; row++) {
            if (row < prev) {
                result.set(col, row, picture.get(col, row));
            } else {
                result.set(col, row, picture.get(col, row+1));
            }
        }
    }
    picture = result;
    distTo = null;
    edgeTo = null;
    energy = null;
  }
}
```

In some embodiments, the device 400 may update the set of logging entries by restoring the second image with the reduced size. In some embodiments, the device 400 generates the further set of logging entries by restoring the second image. As mentioned above, the set of logging entries may be represented as l(k,t) and the restoring module 340 may restore the second image to the logging entry which may be represented as l'(k,t).

For example, after converting the second image to the logging entries, only the non-duplicated logging entries may be kept. In this way, it can keep consistency between different log engines and can guarantee the patterns of originated logs are maintained to destination after several hops of control. Further, it is more intelligent and applicable to dynamically changed environment.

In some embodiments, the device 400 may also merge the restored set of logging entries. In some embodiments, the device may merge all the restored logging entries l'(k,t) into E'(t) according to time stamp and sequence identity and output the merged logging entries to downstream logging system.

Figure 7:
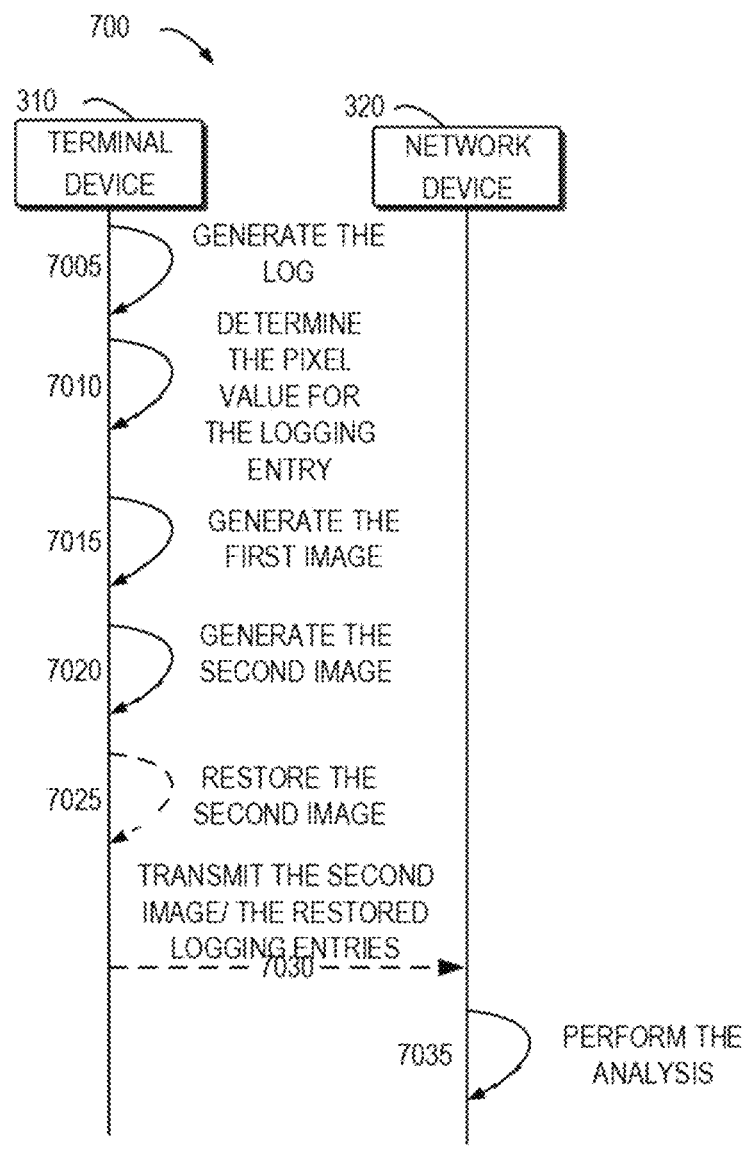
FIG. 7 illustrates interactions between devices according to embodiments of the present disclosure.

FIG. 7 illustrates interactions between devices according to embodiments of the present disclosure. The terminal device 310 generates 7005 the log for one or more applications. The terminal device 310 determines 7010 the pixel value for the logging entry based on the content record by the logging entry, for each of the set of logging entries l(k,t). The pixel value may be determined using a predetermined function. The set of logging entries has the same header. The header specifies the source of the logging entries. In some embodiments, the terminal device 310 may calculate the pixel value of each log entry via a normalization function in its incoming sequence.

In some embodiments, the terminal device 310 may generate a signature of the logging entry. The signature is specific to the content of the logging entry. The terminal device 310 may perform normalization on the signature and generate the pixel value based on the normalized signature. For example, the normalized function may be defined as MD5 function of the given log string for simplicity.

In other embodiments, the terminal device 310 may generate the pixel value for the logging entry based on the frequency of the occurrence of the logging entry in the set of logging entries, the higher frequency the smaller pixel values. For example, if the logging entry occurs less than a predetermined number of times, the pixel value may be determined as a first value. If the logging entry occurs more than the predetermined number of times, the pixel value is determined as a second value. The second value is smaller than the first value.

In some embodiments, the normalized function is given as 1/frequency. For example, when the logging entry occurs once in the set of logging entries, its pixel value is 1, the more frequent it occurs, the less value it may be.

The terminal device 310 generates 7015 the first image for the set of logging entries based on the pixel values. In some embodiments, the terminal device 310 may sort the pixels based on their arrival time. For example, the terminal device 310 may sort the pixel values in an order of arrival times of the respective logging entries in the set of logging entries. The terminal device 310 may further combine the sorted pixel values to generate the first image.

The terminal device 310 may also determine the sequence identity of the pixel value based on its arrival time. For example, the terminal device 310 may put this pixel value in grids with x coordinate which is the sequence identity to generate the image.

The terminal device 310 generates 7020 the second image by reducing the size of the first image. For example, as mentioned above, the number of pixels in the first image may be number of entries in the set l(k,t) and the number of pixels in the second image may be less than L(k,t). In some embodiments, the terminal device 310 may reduce the first image size by seam carving algorithm. It should be noted that the size of the image may be reduced by any suitable ways.

In some embodiments, the terminal device 310 may restore 7025 the second image to obtain a set of restored logging entries and may transmit 7030 the set of restored logging entries to the network device 320. Alternatively, the terminal device 310 may transmit 7030 the second image or a transformation of the second image to the network device 320. The network device 320 may restore the second image to obtain the set of restored logging entries.

The network device 320 performs 7035 the analysis based on the further set of restored logging entries. For example, the network device 320 may perform bug fixing analysis. Alternatively or in addition, the network device 320 may perform user behavior analysis.

In some embodiments, an apparatus for performing the method 500 (for example, the device 400) may comprise respective means for performing the corresponding steps in the method 500. These means may be implemented in any suitable manners. For example, it can be implemented by circuitry or software modules.

In some embodiments, the apparatus comprises means for determining a pixel value for the logging entry based on a content of the logging entry, for each logging entry of a set of logging entries; means for generating an first image for the set of logging entries based on the pixel values; means for generating a second image by reducing a size of the first image using a predetermined algorithm.

In some embodiments, the means for determining the pixel value for the logging entry comprises: means for generating a signature for the logging entry, the signature being specific to the content; means for performing normalization on the signature; and means for determining a normalized value of the signature as the pixel value.

In some embodiments, the means for determining the pixel value for the logging entry comprises: means for determining the pixel value for the logging entry based on a frequency of an occurrence of the logging entry in the set of logging entries.

In some embodiments, the means for determining the pixel value for the logging entry comprises: means for determining the pixel value to be a first value, if the logging entry occurs a predetermined number of times in the set of the logging entries; means for determining the pixel value to be a second value, the second value being smaller than the first value, if the logging entry occurs more than the predetermined number of times in the set of the logging entries.

In some embodiments, the means for generating the first image comprises: means for sorting the pixel values in an order of arrival times of the respective logging entries; and means for combining the sorted pixel values to generate the first image.

In some embodiments, the means for reducing the size of the image comprises: means for determining a set of pixels in the image with pixel values below a threshold value; and means for generating the second image by removing the set of pixels from the first image.

In some embodiments, the apparatus further comprise means for generating a further set of logging entries by restoring the second image using.

Figure 8:
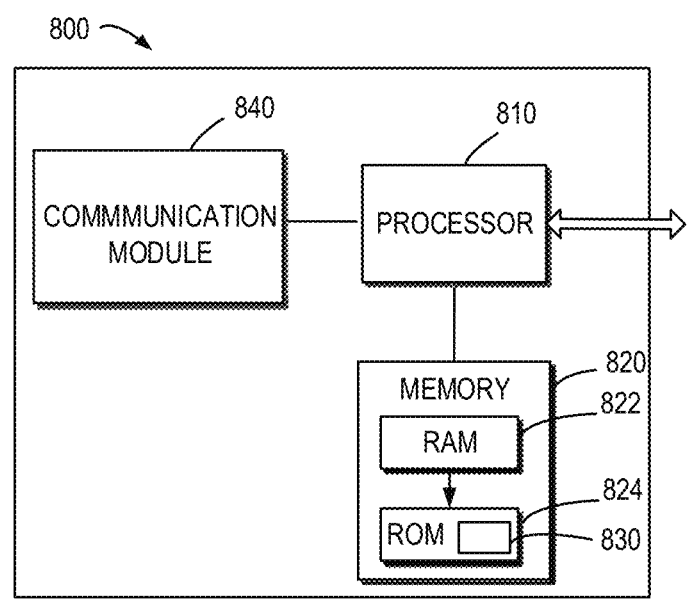
FIG. 8 illustrates a schematic diagram of a device according to embodiments of the present disclosure.

FIG. 8 is a simplified block diagram of a device 800 that is suitable for implementing embodiments of the present disclosure. The device 800 may be provided to implement the communication device, for example the device 400 shown in FIG. 4. As shown, the device 800 includes one or more processors 810, one or more memories 820 coupled to the processor 810, and one or more communication module (for example, transmitters and/or receivers (TX/RX)) 640 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIG. 5 to FIG. 7. The embodiments of the present disclosure may also be implemented by hardware or by a combination of software and hardware.

Figure 9:
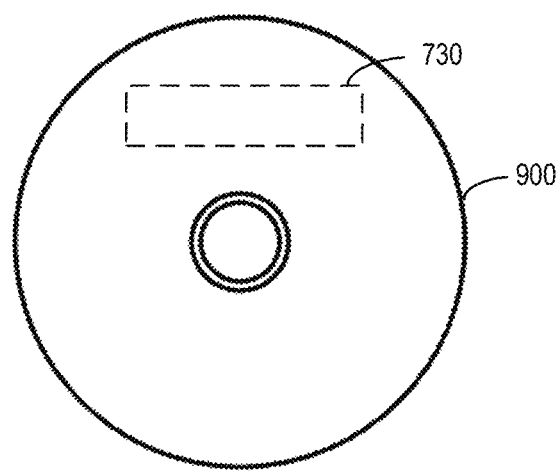
FIG. 9 shows a block diagram of an example computer readable medium in accordance with some embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device comprising:
   at least one processor; and
   at least one memory including computer program codes;
   the at least one memory and the computer program codes are configured to, with the at least one processor, cause the device to:
   for each logging entry of a set of logging entries, determine a pixel value for the logging entry based on a content of the logging entry;
   generate a first image for the set of logging entries based on the pixel values;
   generate a second image by reducing a size of the first image using a predetermined algorithm, and
   generate a further set of logging entries by restoring the second image.

2. The device of claim 1, wherein the device is caused to determine the pixel value for the logging entry by:
   generating a signature for the logging entry, the signature being specific to the content;
   performing normalization on the signature; and
   determining a normalized value of the signature as the pixel value.

3. The device of claim 1, wherein the device is caused to determine the pixel value for the logging entry by:
  determining the pixel value for the logging entry based on a frequency of an occurrence of the logging entry in the set of logging entries.

4. The device of claim 3, wherein the device is caused to determine the pixel value for the logging entry by:
  if the logging entry occurs a predetermined number of times in the set of the logging entries, determining the pixel value to be a first value;
  if the logging entry occurs more than the predetermined number of times in the set of the logging entries, determining the pixel value to be a second value, the second value being smaller than the first value.

5. The device of claim 1, wherein the device is caused to generate the first image by:
  sorting the pixel values in an order of arrival times of the respective logging entries; and
  combining the sorted pixel values to generate the first image.

6. The device of claim 1, wherein the device is caused to generate the second image by:
  determining a set of pixels in the image with pixel values below a threshold value; and
  generating the second image by removing the set of pixels from the first image.

7. A method comprising:
  for each logging entry of a set of logging entries, determining a pixel value for the logging entry based on a content of the logging entry;
  generating a first image for the set of logging entries based on the pixel values;
  generating a second image by reducing a size of the first image using a predetermined algorithm; and
  generating a further set of logging entries by restoring the second image.

8. The method of claim 7, wherein determining the pixel value for the logging entry comprises:
  generating a signature for the logging entry, the signature being specific to the content;
  performing normalization on the signature; and
  determining a normalized value of the signature as the pixel value.

9. The method of claim 7, wherein determining the pixel value for the logging entry comprises:
  determining the pixel value for the logging entry based on a frequency of an occurrence of the logging entry in the set of logging entries.

10. The method of claim 9, wherein determining the pixel value for the logging entry comprises:
  if the logging entry occurs a predetermined number of times in the set of the logging entries, determining the pixel value to be a first value;
  if the logging entry occurs more than the predetermined number of times in the set of the logging entries, determining the pixel value to be a second value, the second value being smaller than the first value.

11. The method of claim 7, wherein generating the first image comprises:
  sorting the pixel values in an order of arrival times of the respective logging entries; and
  combining the sorted pixel values to generate the first image.

12. The method of claim 7, wherein generating the second image comprises:
  determining a set of pixels in the image with pixel values below a threshold value; and
  generating the second image by removing the set of pixels from the first image.

13. A non-transitory computer readable medium storing instructions thereon, the instructions, when executed by at least one processing unit of an apparatus, causing the apparatus to:
  for each logging entry of a set of logging entries, determine a pixel value for the logging entry based on a content of the logging entry;
  generate a first image for the set of logging entries based on the pixel values;
  generate a second image by reducing a size of the first image using a predetermined algorithm; and
  generating a further set of logging entries by restoring the second image.

14. The non-transitory computer readable medium storing instructions of claim 13, wherein the apparatus is further caused to determine the pixel value for the logging entry by:
  generating a signature for the logging entry, the signature being specific to the content;
  performing normalization on the signature; and
  determining a normalized value of the signature as the pixel value.

15. The non-transitory computer readable medium storing instructions of claim 13, wherein the apparatus is further caused to determine the pixel value for the logging entry by:
  determining the pixel value for the logging entry based on a frequency of an occurrence of the logging entry in the set of logging entries.

16. The non-transitory computer readable medium storing instructions of claim 15, wherein the apparatus is further caused to determine the pixel value for the logging entry by:
  if the logging entry occurs a predetermined number of times in the set of the logging entries, determining the pixel value to be a first value;
  if the logging entry occurs more than the predetermined number of times in the set of the logging entries, determining the pixel value to be a second value, the second value being smaller than the first value.

17. The non-transitory computer readable medium storing instructions of claim 13, wherein the apparatus is further caused to generate the first image by:
  sorting the pixel values in an order of arrival times of the respective logging entries; and
  combining the sorted pixel values to generate the first image.

18. The non-transitory computer readable medium storing instructions of claim 13, wherein the apparatus is further caused to generate the second image by:
  determining a set of pixels in the image with pixel values below a threshold value; and
  generating the second image by removing the set of pixels from the first image.

* * * * *